TELEPHONE ANSWERING AND RECORDING DEVICES

Filed March 21, 1952 2 Sheets-Sheet 1

INVENTORS
H. R. VAN DEVENTER
PAUL C. BAILEY
BY
Van Deventer & Shively
ATTORNEYS

TELEPHONE ANSWERING AND RECORDING DEVICES

Filed March 21, 1952 2 Sheets-Sheet 2

INVENTORS
H. R. VAN DEVENTER
PAUL C. BAILEY
BY
Van Deventer & Shively
ATTORNEYS

United States Patent Office 2,793,250

Patented May 21, 1957

2,793,250

TELEPHONE ANSWERING AND RECORDING DEVICES

Harry R. Van Deventer, New York, N. Y., and Paul C. Bailey, Hatboro, Pa., assignors, by direct and mesne assignments, to Telephone Answering and Recording Corporation, New York, N. Y., a corporation of New York Application March 21, 1952, Serial No. 277,754

16 Claims. (Cl. 179—6)

This invention relates to control circuits for phonographs and is particularly valuable in connection with phonographs as used in telephone answering and recording devices, such for example as disclosed in the copending application Serial Number 30,538, filed on June 2, 1948.

While for the sake of illustration the invention will be applied to such devices using disc records, it will be obvious to those skilled in the art that it may be applied with equal advantage to devices where a wire or tape or other recording medium is used, the invention residing in the circuits and combination of apparatus used to produce the new and useful results obtained, rather than in the details of construction of the apparatus per se.

The chief object of the invention is the utilization of any means, such as a control relay, in one of the power supply circuits of the amplifier to control the operation of the motor or motors of a phonograph or phonographs to prevent recording or playback until the amplifier output is sufficient to record and reproduce properly.

Other objects and advantages will be referred to in the following specification wherein is disclosed, by way of illustration, one embodiment of the invention. This disclosure is merely illustrative and many changes can be made, the invention being as defined in the appended claims.

Figures 1, 2:
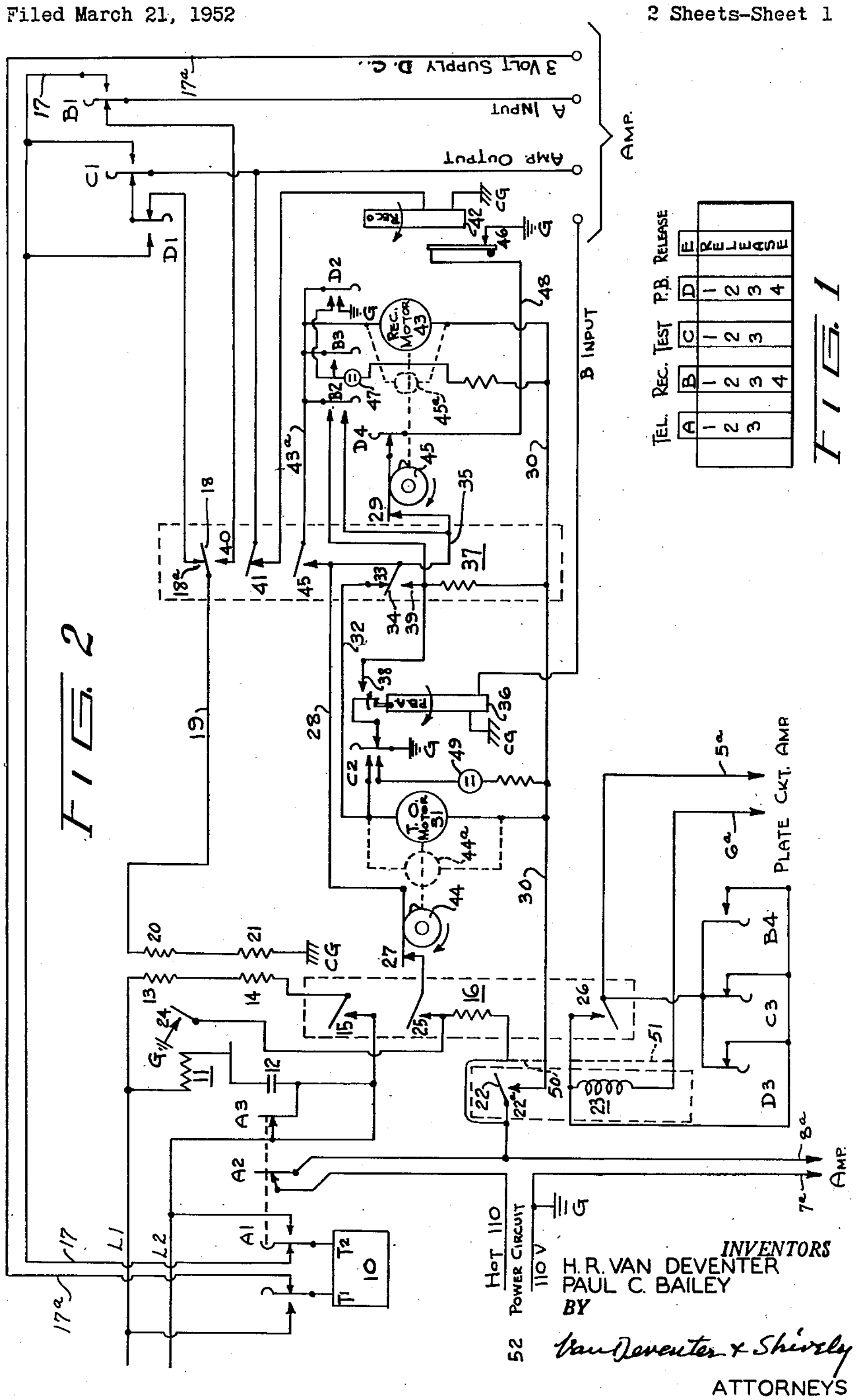
Figure 1 is a diagram of a key with inter-locking buttons that may be used in the circuit shown in Figure 2.
Figure 2 is a circuit diagram illustrating the control circuits of the invention.

The keys, Figure 1, are of the inter-locking button type in common use and comprises the buttons A, B, C, D, E. Any button depressed except E remains locked down, and locks all its associated contacts, A—1—2—3 for example, until released by depressing any other button. Button E does not lock and when depressed merely releases any other button that may be down.

The various contacts for each of these buttons are shown at convenient places in the diagram, Figure 2, as this makes it easier to trace the circuits and avoids crossing wires.

*Using telephone instrument only (key A)*

Referring to Figure 2 a telephone instrument 10 of any suitable type having the usual transmitter and receiver, ringer and switch hook is connected to the long springs of contacts A1. When the A key is depressed, the telephone is connected directly to the communication line L1, L2. By "communication line" is meant a line or circuit over which speech may be transmitted, such as a subscriber's telephone line, which may terminate in a central office so that it can be connected to other lines. Hereinafter, for the sake of brevity, this is called the "line circuit."

When key A is depressed, the telephone instrument is connected to the line circuit for ordinary use, and by contacts A—2 the 110 v. power circuit is opened so that the answering and recording instrument is not operative.

When key A is depressed the contacts A—3 open the circuit through the ringing relay 11 and condenser 12, and the line circuit L1, L2 can now be tested from the central office in the usual manner to determine the condition of the telephone instrument which is the only instrumentality then connected to said line.

It will be noted that the line circuit connected to repeating coil windings 13, 14, is normally open at contact 15 of the starting relay 16.

*Automatic answering of incoming calls and recording of incoming speech*

All keys being normal, the telephone instrument is connected via the inside contacts A—1 to conductors 17, 17*a*. This connects the T1 side of the telephone to a 3-volt current supply in the "power supply" 54, Figure 3, and from the chassis ground CG thereof, the return circuit to the telephone may be traced through the output circuit of amplifier 53, through the normally closed contacts C1 and D1 to the normally closed contacts 18 and 18*a* of the mid-cycle relay 37, via conductor 19 to repeating coil windings 20, 21 to CG. The 110 v. A. C. power circuit 52 is closed at contacts A2 and one side thereof is shown grounded at G merely to save wiring on the diagram. The hot side of the power circuit connects to the normally open contact 22 of the control or plate relay 23 which is in series with the plate circuit 5*a*, 6*a* of the amplifier 53 via normally open contacts 26 of relay 16.

A. C. ringing current being applied to the line circuit, ringing relay 11 is energized and its contacts 24 close momentarily. This places starting relay 16 across the power circuit 52 and said relay closes the three sets of contacts 15, 25 and 26. Contacts 15 close to connect the repeating coil windings 13, 14 across the line circuit L1, L2. These windings act as a holding coil on CB lines.

Contacts 25 lock relay 16 in the power circuit 30, G via timer contact 27 on timer 44 and conductor 28 to timer contact 29 to G via contact D4 and switch 46. This locks the relay 16 in circuit at the first instant contacts 24 close, and makes said relay thereafter independent of relay 11.

Normally open contacts 26 on relay 16 are serially included with relay 23 and the plate circuit 5*a*, 6*a* of the amplifier 53. When these contacts 26 close, plate current will flow from power transformer secondary 56 and energize relay 23 as the tube filaments in the amplifier tubes are energized via the amplifier power circuit 7*a*, 8*a* to the power supply 54, said circuit being closed at contacts A2 when the apparatus is awaiting an incoming call.

When the contacts 22, 22*a* on relay 23 close, power is applied from power circuit 52 via conductor 30 to the talk-out motor 31 of the reproducing phonograph, the power circuit being completed therethrough via conductor 32, contacts 33, 34 on relay 37 and conductor 35 to G via contacts 29, D4, conductor 48 and switch 46. The motor 31 operates; the translator or pick-up 36 is connected to the B input of the amplifier 53 and is therefore coupled to the "output" thereof which, via contacts $C^1$, $D^1$ and contacts 18, 18*a* on relay 37, connect to repeating coil windings 20 and 21, which are in inductive relation to the line circuit windings 13, 14.

The pick-up being in operative relationship to the record moved by motor 31, speech recorded on said record will be transmitted via the circuits just described to the calling subscriber connected to the line circuit L1, L2 via repeating coil 13, 14, 20, 21.

When the pickup 36 has reached the end of the talk-out recording, mid-cycle switch 38 is closed momentarily. This grounds relay 37 via contacts C2 and closes contact 34 onto contact 39 on relay 37, thereby locking said relay across the power circuit 30, G via timer contact 29 to D4, to 46 to G.

Relay 37 closes contact 18 to contact 40, switching the repeating coil windings 20, 21 from "amplifier output" to the "A input" thereof via the normally closed contacts of key B1. Relay 37, by closing contacts 41, connects the "amplifier output" to the translator or recorder head 42.

Power via conductor 30 operates recording motor 43 via conductor 43A and contact 45 on relay 37 to ground G via conductor 35, timer contact 29, contacts D4 to switch 46.

Recorder 42 being operatively associated with the record moved by motor 43, incoming speech over line L1, L2 will be recorded in a manner that will be obvious from the drawing.

The full cycle automatic reset timer 44 may be driven by motor 31 or in any suitable manner, as by a separate motor as shown in dotted lines 44*a*, as long as it starts when motor 31 starts, and continues until the recording motor 43 stops. Timer 44 may be set to operate for any desired overall time, say sixty seconds, which will allow for a thirty second talk-out message and thirty seconds recording. Timer 44 is a safety device in case of the failure of switch 38 or timer 45.

Timer 44 in operation opens contact 27 and releases relay 16, releasing contact 26 which releases relay 23 opening contacts 22, 22*a*. This opens the circuit to power supply conductor 30 and stops motor 31.

The playback arm 36 is automatically reset to starting position by any suitable mechanism, such as that shown in the aforesaid copending application, and this is not shown here in detail.

The automatic reset timer 45 may be driven by motor 43 or in any suitable manner, as by motor 45*a* shown in dotted lines, as long as it starts when motor 43 of the recording phonograph starts, and continues for the desired recording time, say thirty seconds at the end of this period, it opens contacts 29. This opens the G side of the power circuit to relay 37 and motor 43, and relay 16, restoring all circuits to normal condition awaiting the next call. The only live power circuit in the apparatus while awaiting a call is the filament suppy circuit in the amplifier.

The limit switch 46 is arranged to be operated by the relative movement of the translator 42 and the record moved by motor 43, so that at the end of the record, the power circuit to G, 46 will be opened, stopping the operation of the device until the record is changed or, if a wire or tape record is used, is rewound. While the device is standing with switch 46 open, if an incoming call is received, relay 11 will buzz, thereby signalling anyone near the instrument to operate key A and use the telephone 10 to answer the call. If no one is present, the device cannot start as there is no power circuit through relay 16, the circuits 27, 28, 35, 29, D4 and 48 being open at 46. While relay 16 may pulse as contact 24 of relay 11 operates, relay 16 cannot lock in as the holding circuit 48, 28 is open at switch 46.

*Recording the talk-out record (key B)*

A suitable record blank is moved by motor 43. To record on said blank, key B is locked down. A 3-volt D. C. current supply is connected to the telephone at T1 via conductor 17*a* to supply the telephone transmitter with talking current. The other side of the telephone connects via connector 17 and connects via contacts B1 to the "A input circuit" of the amplifier 53, the output side thereof being connected via contact 41 on relay 37 when same operates. Contacts B2 ground motor 43 and relay 37 via conductors 35, contact 29, D4 conductor 48 and switch 46. Contacts B3 connect the neon "talk" signal lamp 47 across the power circuit 30, G. Contacts B4 short contacts 26 of relay 16 thereby completing the plate circuit through plate relay 23 independent of relay 16.

Assuming no keys were depressed until B, the amplifier power circuit is closed at contacts A2 as soon as that key is released by B. This connects the tube filaments to the power supply and the plate current begins to flow. In about 4 to 12 seconds, depending upon the condition of the tubes, current in the plate circuit is sufficient to close relay 23 which operates contacts 22, 22*a*, and power conductor 30 is energized starting motor 43 and operating relay 37. Lamp 47 is lighted thereby notifying the user to start recording. Motor 31 is disconnected from the power circuit while recording the talk-out record, at contacts 33, 34 on relay 37. Timer 45 operates to limit the recording to thirty seconds as when contact 29 opens, the ground G at 46 is cut off. The talk-out record having been made by speaking into the telephone transmitter the release key E is depressed, restoring the B key to normal and the talk-out record is removed from motor 43 and placed for operation by motor 31.

*Testing the talk-out record (key C)*

Key C is depressed, and contacts C—1 thereof connect the "amplifier output" to conductor 17 and to the T—2 side of the telephone, the T—1 side thereof being connected via conductor 17*a* to the 3 v. transmitter current supply to the chassis ground CG. Contacts C—2 ground motor 31 driving the talk-out record, and the power circuit through this motor is complete up to the open contact 22*a* on plate relay 23.

Contacts C—3 close the plate circuit through relay 23.

The "amplifier power circuit" is closed at contacts A—2.

When the amplifier tubes are warmed up, current flows in the plate circuit operating relay 23 which closes contacts 22—22*a* starting motor 31.

The play-back arm carrying pick-up 36 is placed over the record and the speech on this record is delivered via 36 to the B input of the amplifier and from there via the "output" thereof to the telephone 10 and may be heard in the receiver thereof. Obviously motor 31 will not start until the amplifier circuits are in operating condition.

Having listened to the play-back as often as desired, the user pushes the release key E which restores all circuits to normal.

A neon signal lamp 49 is connected via contacts C2 across the power circuit 30, G and remains lighted as long as motor 31 is in operation, warning the user to release the key C when through testing.

*Playing back recordings made via the telephone line circuit (key D)*

Key D is depressed and contacts D1 thereof connect the "amplifier output" to conductor 17 and to the T2 side of the telephone, the T1 side thereof being connected via conductor 17*a* to the 3-volt transmitter current supply to chassis ground CG. Contacts D2, ground motor 43 drive the record which has received a recording via the telephone line circuit as previously described under the heading "Automatic answering of incoming calls and recording speech." Contacts D3 close the plate circuit through relay 23.

The "amplifier power circuit" is closed at contacts A2.

When the amplifier tubes are warmed up, current flows in the plate circuit operating relay 23 which closes contacts 22, 22*a* starting motor 43 via conductor 30 and ground at D2. The pick-up 36 is operatively associated with the record moved by motor 43 and speech on the record is delivered via 36 to the "B input" of the amplifier and from there via the output thereof to the telephone 10 and may be heard in the receiver thereof. Obviously motor 43 will not start until the amplifier circuits are in operating condition.

Having listened to the play-back as often as is desired, the user pushes the release key E which restores all circuits to normal.

The signal lamp 47 may be connected via contacts D2 across power circuit 30, G and remains lighted as long as motor 43 is in operation, warning the user to release key D when through playing back.

Contacts D4 open the power circuit through timer 45 and switch 46.

By perusal of the foregoing specification the advantages of controlling relay 37 and motors 31 and 43 by the control relay 23 can be determined. This will, however, be more apparent if consideration is given to what happens if other circuits are used wherein the relay 37 and the motors are directly connected to the power circuit when the starting relay 16 operates. This circuit condition can be studied, referring to Figure 2, by assuming that the relay 23 and its contacts 22, 22a are short circuited by strap wires 50, 51.

It will now be evident that if keys B, C or D are operated and the device has not been connected to the power circuit (which occurs if key A is down for telephone use only) the following occurs:

Key B, when depressed, releases key A and contacts A2 close power circuit to amplifier. Coincident with this motor 43 starts and lamp 47 is lighted. If now the user speaks into the telephone transmitter to record, seeing the signal lamp lighted and the motor running, until the amplifier tubes warm up (four seconds or more) nothing will be recorded as there is not enough plate current available. The result is that in dictating a talk-out record, the words spoken for the first four seconds will not be recorded.

With keys C and D used for test and play-back, the same condition would prevail in connection with the user failing to hear the first four seconds or more of the recordings; although motor 31 or 45 would operate, there would be no amplification until the amplifier warmed up.

It is therefore apparent that relay 23 operates as a time delay (after the operation of relay 16) to prevent either motor from starting until there is sufficient plate current flowing. Obviously any other circuit in the amplifier in which current flows that will operate means such as relay 23, can be used instead of the plate circuit, but it will be observed that the time delay means, such as relay 23, is operated by current obtained from the power circuit 52 via the secondary winding 56 of the power supply transformer generally denoted by numeral 55, which supplies the 6 x 4 tube, as shown in Figure 3.

Other time delay means can be used instead of the electromagnetic relay 23. For example, a thermostatic relay, the heater winding of which would substitute for the winding of relay 23, said thermostatic relay having contacts equivalent to contacts 22, 22a and the closing time of said relay being such that the current flowing in the plate circuit is ample before said contacts close. As such thermostatic relays are well known the same is not illustrated herein. The amplifier 53 and power supply 54, Figure 3, is not described in detail as any suitable amplifier can be used. The numbered and lettered terminals, Figure 2, connect to like numbered and lettered terminals Figure 3.

From the foregoing it will be seen that a reproducing 31 and a recording 45 phonograph are provided with electrically operated means 11, 16, 38, 37 for sequentially controlling the operation of said phonographs; that a power circuit 52 is provided for supplying current to operate said means and phonographs, said phonographs having an amplifier 53 that may be sequentially connected to either of them by said control means. A power supply 54 has a transformer 55 for supplying current to the amplifier, and the secondary winding 56 of this transmitter operates means, such as relay 23, to effect a time delay, permitting the amplifier tubes supplied with current via winding 57 to heat up, and the amplifier reach operating condition before either phonograph is operated.

Figures 3, 4:
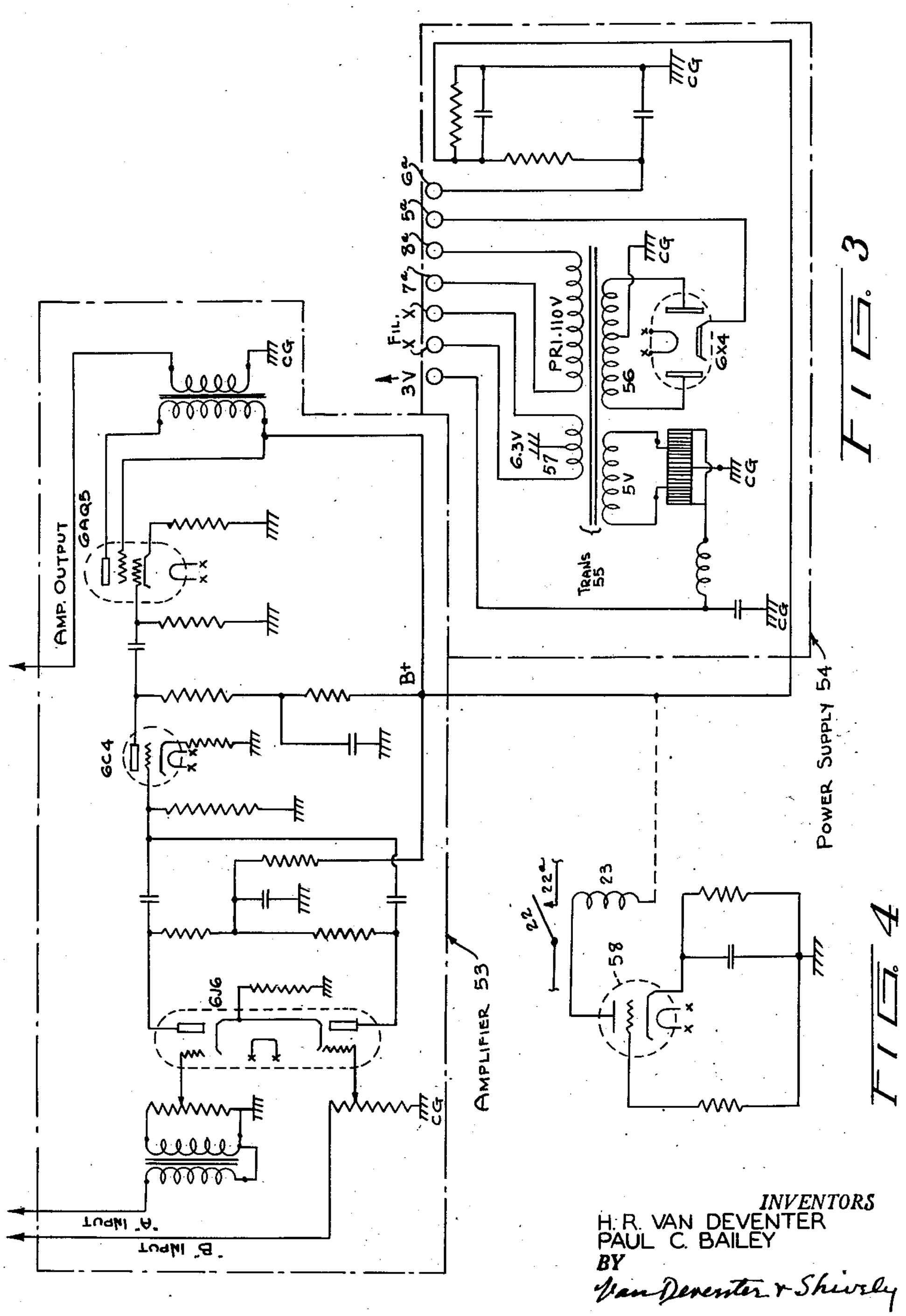
Figure 3 is a circuit diagram of a power supply and amplifier used with the circuits, Figure 1.
Figure 4 shows an alternate method for controlling the relay 23 as shown in Figure 2.

An alternate method for controlling the relay 23 is shown in Figure 4 where a separate tube 58 is connected in a simple electronic circuit in such a manner that the tube will draw plate current when the filament attains its normal temperature, the relay being so adjusted as to operate at the normal plate current of said tube.

The relay 23 may be inserted as shown in the B+ conductor at any point, or may be placed in the cathode circuit of one of the amplifier tubes.

While the power supply is shown having a transformer 55, it will be understood that any other form of power supply may be used, such for example as the usual A. C.—D. C. power supply without transformer.

What is claimed is:

1. In combination, a reproducing phonograph; a recording phonograph; motor means for operating said phonographs; a first electrically operated control means connected to said motor means for sequentially controlling the operation of said phonographs connected thereto; a power circuit for supplying current for the operation of said control means; an amplifier connected to said power circuit and sequentially connected to said phonographs by said control means; and a second control means operated by current flowing in said amplifier for controlling the application of current to said motor means by controlling the application of said power circuit thereto to effect a time delay in the operation of either of said phonographs to permit said amplifier to reach operating condition before the phonograph to be operated starts.

2. The combination as claimed in claim 1, including a telephone instrument having the usual transmitter and receiver; a telephone line circuit; and switch means for connecting said phonographs to said line circuit and for disconnecting said phonographs therefrom and connecting said telephone thereto, said switch means adapted to open said power circuit when said means is positioned to connect said line circuit to said telephone.

3. The combination as claimed in claim 1, including a telephone instrument having the usual transmitter and receiver; and switch means for connecting said telephone to either of said phonographs to record speech via said telephone in said recording phonograph and reproduce speech via said telephone from said reproducing phonograph.

4. The combination as claimed in claim 1, including a timer having normally closed contacts connected to said first control means, means for controlling the starting of said timer controlled by said second control means, said timer controlling the length of time said reproducing phonograph is in operation.

5. The combination as claimed in claim 1, including a timer having normally closed contacts connected to said first control means, means for controlling the starting of said timer controlled by said second control means, said timer controlling the length of time said recording phonograph is in operation.

6. In apparatus of the class described, a telephone transmitter; a phonograph having a record blank; a motor for operating said phonograph; a power circuit connected to said motor for operating same; a translator in operative relationship to said record; an amplifier connected to said translator and transmitter for coupling the same, said amplifier having a plate circuit connected to said power circuit; and control means in said plate circuit for controlling said power circuit connected to said motor whereby power is applied to said motor only when the current flowing in said plate circuit is sufficient to operate said control means, said last means being independent of all pulsations produced in said amplifier by said transmitter.

7. In apparatus of the class described; a telephone receiver; a phonograph having a record with a sound recording thereon; a motor for moving said record; a power circuit connected to said motor for operating same; a translator; an amplifier connected to said translator and receiver for coupling the same, said amplifier having a plate circuit connected to said power circuit; and control means in said plate circuit connected to said motor for controlling said power circuit whereby power is supplied to said motor only when the current flowing in said plate circuit is sufficient to operate said control means, said last means being independent of all pulsations produced in said amplifier.

8. In a device of the class described, a ringing relay adapted to be connected to a circuit and responsive to A. C. current flowing in said circuit and having normally open contacts; a telephone line circuit including said relay; a power circuit; a starting relay having a winding serially included in said power circuit with said contacts; a first set of normally open contacts on said starting relay in parallel with said contacts on said ringing relay whereby upon operation of said ringing relay contacts said first set of contacts will lock said starting relay across said power circuit; an amplifier connected to said power circuit and having a plate circuit therein; a second set of contacts on said starting relay; a control relay connected to said plate circuit via said second pair of contacts for energization by current flowing in said plate circuit; a phonograph having a motor connected to said first set of contacts on said control relay for connecting said motor to said power circuit, said amplifier being connected to said phonograph to amplify the speech input or output thereof.

9. In a device of the class described, a ringing relay adapted to be connected to a circuit and responsive to A. C. current flowing in said circuit and having normally open contacts; a telephone line circuit including said relay; a power circuit; a starting relay having a winding serially included in said power circuit with said contacts; a first set of normally open contacts on said starting relay in parallel with said contacts on said ringing relay whereby upon operation of said ringing relay contacts said first set of contacts will lock said starting relay across said power circuit; an amplifier connected to said power circuit and having a plate circuit therein; a second set of contacts on said starting relay; a control relay connected to said plate circuit via said second pair of contacts for energization by current flowing in said plate circuit; a phonograph having a motor; contacts on said control relay for connecting said motor to said power circuit, said amplifier being connected to said phonograph to amplify the speech input or output thereof; a repeating coil; a communication circuit, and means including a third set of contacts on said starting relay for connecting the windings of said coil to said communication circuit and said amplifier.

10. The combination as claimed in claim 9, including a timer and means for operating same in timed relation with said motor and connected in circuit with said starting relay, said timer having contacts in circuit with said starting relay to open said power circuit thereto at the end of a predetermined period and thereby restore said relay and the circuits controlled thereby to normal non-operative condition.

11. In a device of the class described, a ringing relay adapted to be connected to a circuit and responsive to A. C. current flowing in said circuit and having normally open contacts; a telephone line circuit including said relay; a power circuit; a starting relay having a winding serially included in said power circuit with said contacts; a first set of normally open contacts on said starting relay in parallel with said contacts on said ringing relay whereby upon operation of said ringing relay contacts said first set of contacts will lock said starting relay across said power circuit; an amplifier connected to said power circuit and having a plate circuit therein; a second set of contacts on said starting relay; a control relay connected to said plate circuit via said second pair of contacts for energization by current flowing in said plate circuit; a phonograph having a motor; contacts on said control relay for connecting said motor to said power circuit, said amplifier being connected to said phonograph to amplify the speech input or output thereof; a repeating coil; a communication circuit, means including a third set of contacts on said starting relay for connecting the windings of said coil to said communication circuit and said amplifier; a mid-cycle switch operated by the relative movement of said phonograph record and the translator thereof; a second phonograph having a motor connected to said power circuit via said last switch; a mid-cycle relay controlled by said last switch; and contacts on said last relay for disconnecting said first phonograph and connecting said second phonograph to said amplifier and repeating coil.

12. The combination as claimed in claim 11, including a timer operable in unison with the motor of said second phonograph and connected in circuit with said starting relay to open the power circuit of same at the end of a predetermined period and thereby restore said starting relay and said mid-cycle relay and the circuits controlled thereby to normal non-operative condition.

13. In combination with a telephone line circuit, a repeating coil having windings, means responsive to incoming ringing current for connecting a winding of said coil to said line including a starting relay having contacts serially including said last winding and said line circuit, a phonograph having a motor, a source of power, an amplifier including a transformer having a winding connected to said source of power and a secondary winding connected to said amplifier, means for connecting said amplifier to said phonograph, relay means responsive to current received from said secondary winding for connecting said phonograph motor to said source of power, a telephone instrument including a transmitter and receiver and a switch which in one position disconnects all said apparatus from said power supply and connects said telephone instrument to said line circuit and in another position connects said power supply to said starting relay and amplifier.

14. In a device of the character described wherein there is employed two phonographs, means connected to said phonographs for sequentially operating the same to first transmit to and then record speech via a communication circuit, a communication circuit; said phonographs each having a motor, said motors being supplied with current via contacts in a control relay, a control relay for operating said contacts; a transformer having primary and secondary windings, said relay being operated by current obtained from a secondary winding of said transformer; an amplifier arranged for sequential connection with said phonographs means for switching said amplifier from one of said phonographs to the other; a telephone instrument having a transmitter and receiver, a first switch means for connecting said telephone instrument to said communication circuit and to disconnect all other of said instrumentalities therefrom, a second switch means for connecting said telephone to the first one of said phonographs to record speech via said telephone, a third switch means for connecting said telephone to said first phonograph to receive speech therefrom, and a fourth switch means for connecting said telephone to the second phonograph to receive speech therefrom, each of said switch means being independently operable by a push button, all said buttons being interlocking whereby each button when pressed will release any other button then locked in operating position all said buttons when in non-operating condition leaving said device arranged for sequential operation as aforesaid via said communication circuit.

15. In combination with a reproducing phonograph and a recording phonograph and control means for sequentially operating said phonographs; motor means for operating said phonographs; an amplifier sequentially connected to said phonographs by said control means, said amplifier having a plate current supply; a relay having a winding in series with said plate current supply; and normally open contacts on said relay serially included in a circuit including said motor means and a source of current whereby the operation of said motor means is controlled by said relay.

16. In combination, a reproducing phonograph; a recording phonograph; motor means for operating said phonographs; electrically operated control means for sequentially controlling the operation of said phonographs; a power circuit for supplying current for the operation of said control means; an amplifier sequentially connected to said phonographs by said control means; a transformer having a winding connected to said power circuit and a second winding connected to said amplifier; and means operated by current flowing in said second winding for controlling the application of current to said motor means to effect a time delay in the operation of either of said phonographs to permit said amplifier to reach operating condition after the operation of said control means and before either of said phonographs has started.

References Cited in the file of this patent

UNITED STATES PATENTS

| | | |
|---|---|---|
| Re. 23,112 | Squire | May 10, 1949 |
| 2,004,893 | Hall | June 11, 1935 |
| 2,221,883 | Rowe | Nov. 19, 1940 |
| 2,411,501 | Brubaker | Nov. 26, 1946 |